May 25, 1954  W. WINEMAN, JR  2,679,431
VEHICLE BODY COMPRISING REPLACEABLE PANELS
Filed March 31, 1950  2 Sheets-Sheet 2
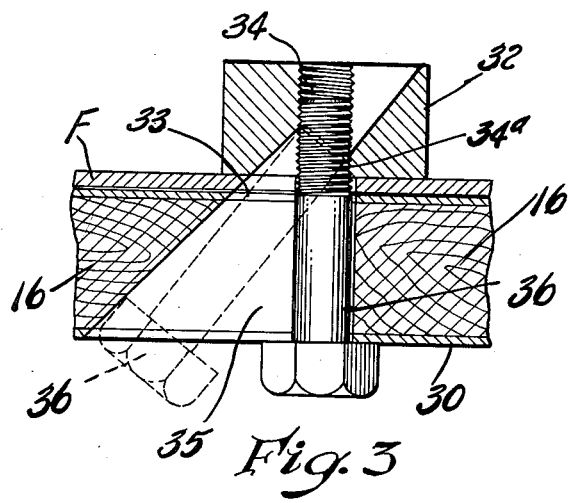
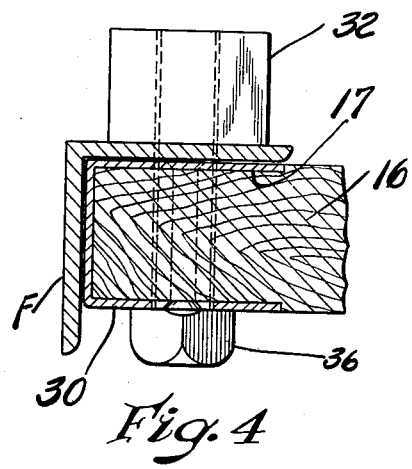
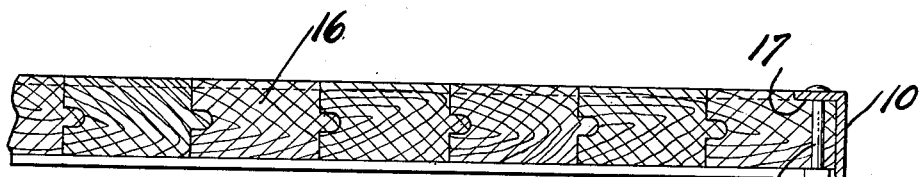
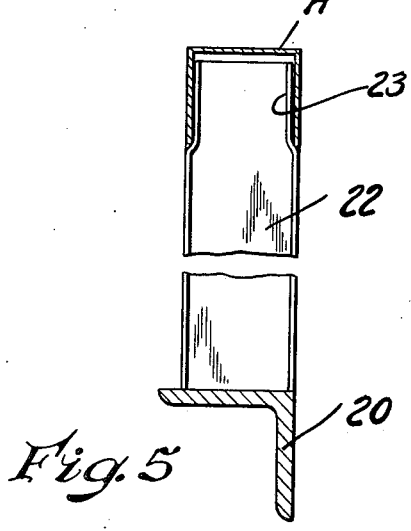
INVENTOR.
Walter Wineman Jr.
BY Frank C. Kerman.
ATTORNEY

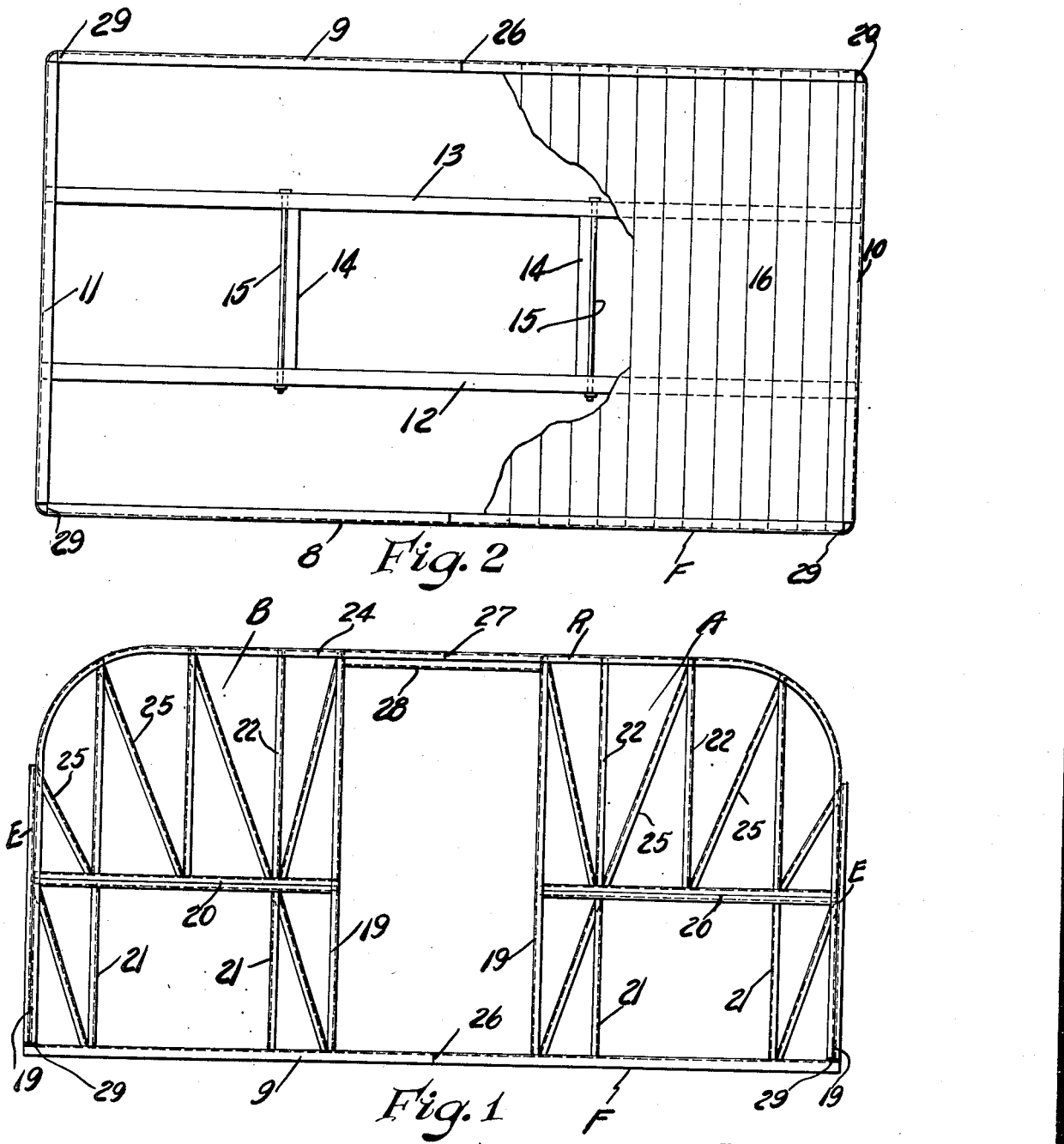

Patented May 25, 1954

2,679,431

UNITED STATES PATENT OFFICE 2,679,431

VEHICLE BODY COMPRISING REPLACEABLE PANELS

Walter Wineman, Jr., Sebewaing, Mich.

Application March 31, 1950, Serial No. 153,110

6 Claims. (Cl. 296—28)

This invention relates to vehicle bodies such as used on trucks, passenger and freight carrying vehicles in general, and has to do more particularly with the construction of the body and floor thereof.

It is well known that a great deal of merchandise of various classifications is transported in great quantities by trucks of various kinds. The bodies of commercial trucks are subjected to severe stresses in use and must be of adequate mechanical strength to withstand the stresses encountered, and all parts must be tightly secured together. Furthermore, in case of serious damage to the body, the repair thereof is often expensive and time-consuming, requiring that the truck remain out of service for a considerable length of time with resultant serious loss to the truck owner or operator.

One of the prime objects of the invention is to eliminate these expensive delays and repair by providing a body construction which is made up of a plurality of readily replaceable units or panels, any one of which can be readily removed and/or replaced by a similar standard panel, without great expense or serious loss of time to the truck owner or the operator.

Another object of the invention is to provide a comparatively lightweight body possessed of adequate mechanical strength, which is very economical to construct, and in which the structure is composed of a plurality of sectional truck units which form the side walls and back of the vehicle.

A further object is to provide a simple, practical, and inexpensive construction, comprising channel-shaped, longitudinal members to which the individual vertical members are welded, the ends of the vertical members being reduced to readily fit in the channel and are welded thereto, after which the weld is ground to form a smooth joint.

Still a further object is to design a lightweight body construction in which the entire upper body section can be easily and quickly removed from the floor of the vehicle, so that the vehicle may be used either as a platform or stake body, or as a complete enclosed structure for the delivery of milk, packaged or bottled products or any other transportable articles, materials or produce.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side-elevational view showing an assembled body frame.

Fig. 2 is a top, plan view illustrating the vehicle floor construction, the floor boards being broken away to show the main frame members.

Fig. 3 is an enlarged, modified fragmentary detail view showing the method of locking the frame of the body to the floor, the broken lines showing the securing bolt in released position.

Fig. 4 is a transverse-sectional view thereof.

Fig. 5 is a transverse-sectional view illustrating the welding of the braces to the channels etc.

Fig. 6 is an enlarged, fragmentary, sectional view through the floor of the vehicle.

Referring now more specifically to the drawings in which I have shown the preferred embodiment of my invention, the numerals 8 and 9 indicate the side members of the floor frame which is connected by the front and rear members 10 and 11 respectively.

Spaced-apart, longitudinal bed beams 12 and 13 span the frame and transversely disposed braces 14 span these bed beams, and tie rods 15 serve to secure the bed beams in proper spaced relation.

The members 8, 9, 10 and 11 are preferably formed of angle iron, and suitable flooring 16 is laid on the bed beams 12 and 13, and the ends of the floor planks are rabbeted as at 17, so that the face of the floor will be flush with the face of the angle members 8, 9, 10 and 11, and bolts 18 serve to secure the members in proper relation.

Vertically disposed brace members 19 are welded to the rectangular floor frame F and the roof frame R to form corner posts and door framing, and horizontally disposed members 20 span the vertical uprights 19 at a point intermediate their length, short brace members 21 being welded to the floor frame members 8, 9, 10 and 11 and to the horizontal members 20. Similar vertical braces 22 are welded to the members 20 and to the roof frame R, all as shown in Fig. 5 of the drawings, and it will be noted that the upper ends of the braces 22 are reduced and shouldered as at 23 and are welded to the channel members 24 which form a part of the roof frame. It will be readily apparent that the ends of the braces 22 need not bottom in the member 24, as they can be welded to any portion of the legs of the channel or angle; thus the braces 22 need not be accurately cut and fitted as to length, as it is merely necessary that the end sections of the braces contact a portion of the members 24 so that they can be welded in position.

The diagonally disposed braces 25 are secured in the same manner as are the braces 22 and no further description thereof is deemed necessary.

The body is designed with a plurality of panels which make up the two side walls and the end walls form individual end panels, the body frame and the roof frame being split at 26 and 27 and then welded together to form continuous sections.

A suitable skin or covering (not shown) is secured over the body braces etc. as usual, and should the truck be involved in an accident of any nature that damages the body, any one of these panels marked A, B or E can be individually removed by removing door header 28, then breaking the welds 26 and 27 and the corner welds 28, and this permits ready removal of either of the side panels A and B without dismantling or removing any of the other undamaged portions or panels of said body; the end panels E can be removed in the same manner and a new panel can be easily and quickly placed in position. Further, of course, each panel A and B comprises upper and lower individually braced frames bounded by the members 20 which can be removed as units when the welded joints are broken.

The panel sections above-referred to are produced in multiples of standard widths and heights, making it possible to produce a custom-built body insofar as the customer is concerned, but which to the manufacture is merely a standard production body because of the standard sections used.

The door frame can also be a multiple of the different sizes to suit the width of the side panels; this permits insertion of many different style doors and frame sections in the side or back of any body constructed; in short, the customer can select his body design, specify the length of body; specify the type of door or doors and the price for the entire body can be promptly quoted, as it is merely a matter of figuring standard panels, door frames etc.

In Figs. 3 and 4 of the drawings, I have shown a slightly modified design in which a channel-shaped member 30 forms a binder for the floor 16, said member being fitted on the edge which is rabbeted to form a flush upper and lower face, and this is secured to the horizontally disposed angle frame F which is welded to the lower ends of the uprights and braces 19 and 21 respectively.

Small blocks 32 are welded to the upper face of the frame F and an angularly disposed passage 33 is provided therein, the upper and lower ends of said passage being slotted as shown, the one end wall of the upper slot being threaded as at 34 and the opposite end wall of the lower slot being threaded in a similar manner and as clearly shown at 34ª.

An angularly disposed slotted passage 35 is provided in the floor and binder strip 16 and 30 respectively, all as shown in Fig. 3 of the drawings, and a bolt 36 can be inserted in said slot at an angle, as indicated in broken lines in Fig. 3 of the drawings, after which it can be swung vertically to engage the threaded sections and then screwed tight to form a firm connection.

This makes a very effective, quick-acting securing means so that the body proper can be quickly and easily released and/or secured in position. Should the owner or operator desire to use the vehicle for a milk pick-up or delivery truck in the morning, and have work of a different classification for the balance of the day and which requires a platform or stake body, it can be readily converted, it being merely necessary to release the bolts 36, lift and transfer the body proper onto a suitable support, and the vehicle is thus converted to and is useable as a platform or stake body. There will be but little lost time as the transfer can be quickly made.

From the foregoing description, it will be obvious that I have perfected a very simple, practical and relatively inexpensive body construction and arrangement by means of which the body frame can be readily constructed, and which can then be easily and quickly converted to form a closed body or a platform or stake job.

What I claim is:

1. In a vehicle body, a unitary floor with metallic edge bindings, bolted to the edges thereof, and frames welded to said bindings, side frames welded to said bindings and to said end frames, each side frame comprising individual adjoining longitudinal sections, each section comprising a plurality of individual frames welded together and including an individual braced lower frame and an individual, braced upper frame, the end walls, the side sections, and the upper and lower frames thereof being removable as units when said welds are broken.

2. In a vehicle body, a unitary floor with metallic edge bindings bolted to the edges thereof, end frames welded to said bindings, side frames welded to said bindings and to said end frames, each side frame comprising individual adjoining longitudinal sections, each section comprising a plurality of individual frames welded together and including an individual, braced lower frame and an individual, braced upper frame, a roof frame including longitudinally disposed stringers to which the upper frames of said side sections are welded, the individual frames comprising the side sections being in longitudinally spaced relation to form a doorway between the frames and the stringers and longitudinally disposed edge bindings being split above and below the doorway respectively with the individual portions thereof being welded in abutting relation, the end walls, the side sections including portions of the edge bindings, and the upper and lower frames of said side sections being removable as units when said welds are broken.

3. The combination as defined in claim 1 in which the peripheral edges of said unitary floor are rabbeted so that said bindings fit flush with said floor.

4. In a vehicle body, a unitary floor with metallic edge bindings bolted thereto, side frames welded to said bindings, each side frame comprising individual side frame sections spaced longitudinally one from the other to form a door opening therebetween, longitudinally disposed upper channels connecting the upper ends of said side frame sections, each side section comprising an individual, braced lower frame, and an individual, upper frame welded thereto and to a channel, vertically and diagonally disposed braces for said upper frame having reduced shouldered upper ends to fit within said channel and be welded thereto, the channels and longitudinally disposed edge bindings being split above and under each doorway respectively with the separate portions thereof welded in end-to-end abutting relation, and a header member welded to the separate portions of the channels above each doorway, the individual side sections including portions of the edge bindings and the upper and lower individual frames of said side sections being removable as units when said welds are broken.

5. In a vehicle body, a unitary floor with metallic edge members removably secured to the edges thereof, end frames welded to said edge members, side frames welded to said edge members and to said end frames, at least one of said side frames comprising individual sections extending longitudinally substantially the full length of the body, each section comprising a plurality of individual frames welded together and including an individual braced lower frame and an individual braced upper frame, the end walls, the side sections, and the upper and lower frames thereof being removable as units when said welds are broken.

6. In a vehicle body, a unitary floor with metallic edge members removably secured to the edges thereof, end frames welded to said edge members, side frames welded to said edge members and to said end frames, at least one of said side frames comprising individual side frame sections spaced longitudinally apart to form a door opening therebetween, a longitudinally disposed stringer connecting the upper ends of said side sections and to which said side sections are welded, the stringers and longitudinally disposed edge members being split above and under the doorway respectively with the separate portions thereof welded in end-to-end abutting relation, the individual side sections and longitudinal edge members to which they are welded being removable as units when said welds are broken.

References Cited in the file of this patent

UNITED STATES PATENTS

| Number | Name | Date |
|---|---|---|
| 98,656 | Adt | Jan. 11, 1870 |
| 717,903 | North | Jan. 6, 1903 |
| 1,233,319 | Croce | July 17, 1917 |
| 1,432,223 | Voss | Oct. 17, 1922 |
| 1,643,742 | Ledwinka | Sept. 27, 1927 |
| 1,673,786 | Warhus | June 12, 1928 |
| 2,451,880 | Seckel | Oct. 19, 1948 |

FOREIGN PATENTS

| Number | Country | Date |
|---|---|---|
| 569,359 | Great Britain | May 18, 1945 |